(12) United States Patent
Slupik

(10) Patent No.: US 12,287,105 B2
(45) Date of Patent: Apr. 29, 2025

(54) NETWORKED SENSORS INTEGRATED WITH HEATING, VENTILATION, AND AIR CONDITIONING (HVAC) SYSTEMS

(71) Applicant: Silvair Sp. z o.o., Cracow (PL)

(72) Inventor: Szymon Slupik, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 378 days.

(21) Appl. No.: 17/859,049

(22) Filed: Jul. 7, 2022

(65) Prior Publication Data

US 2023/0022137 A1 Jan. 26, 2023

Related U.S. Application Data

(60) Provisional application No. 63/221,075, filed on Jul. 13, 2021.

(51) Int. Cl.
*F24F 11/63* (2018.01)
*F24F 11/50* (2018.01)
(Continued)

(52) U.S. Cl.
CPC .............. *F24F 11/63* (2018.01); *F24F 11/50* (2018.01); *F24F 2110/10* (2018.01); *F24F 2120/10* (2018.01)

(58) Field of Classification Search
CPC ........ F24F 11/63; F24F 11/50; F24F 2110/10; F24F 2120/10; F24F 11/56; F24F 11/88; Y02B 20/40
See application file for complete search history.

(56) References Cited

U.S. PATENT DOCUMENTS

| 4,918,690 A | 4/1990 | Markkula, Jr. et al. |
| 4,969,147 A | 11/1990 | Markkula, Jr. et al. |

(Continued)

FOREIGN PATENT DOCUMENTS

| CN | 114025312 A | 2/2022 |
| WO | 2010056105 A2 | 5/2010 |
| WO | 2018024528 A1 | 2/2018 |

OTHER PUBLICATIONS

Related U.S. Appl. No. 17/480,486, Notice of Allowance dated Feb. 24, 2023.

(Continued)

*Primary Examiner* — Santosh R Poudel
(74) *Attorney, Agent, or Firm* — McGeary Cukor LLC; Kenneth Ottesen; Jason Paul DeMont

(57) ABSTRACT

A system of networked occupancy sensors and a thermostat that is controlled using data from the sensors. In a data network of occupancy sensors, the sensors (i) sense occupancy in a first space, such as a room within a building, and (ii) transmit data packets. Each of the data packets comprises an indication whose value is based in part on whether occupancy is sensed or not in the first space. The thermostat is situated in the first space and provides a control signal on an output line for controlling heating, ventilation, and air conditioning (HVAC), based on the temperature sensed by the thermostat. A controller unit comprises (i) a radio transceiver, capable of receiving the data packets, and (ii) a processor. The processor modifies the control signal on the output line of the thermostat, based in part on the value of the indication in the packets from the occupancy sensors.

19 Claims, 9 Drawing Sheets

(51) Int. Cl.
*F24F 110/10* (2018.01)
*F24F 120/10* (2018.01)

(56) References Cited

U.S. PATENT DOCUMENTS

| | | | |
|---|---|---|---|
| 5,963,253 | A | 10/1999 | Dwyer |
| 6,353,853 | B1 | 3/2002 | Gravlin |
| 6,580,950 | B1 | 6/2003 | Johnson et al. |
| 6,756,998 | B1 | 6/2004 | Bilger |
| 6,792,319 | B1 | 9/2004 | Bilger |
| 6,873,610 | B1 | 3/2005 | Noever |
| 6,891,838 | B1 | 5/2005 | Petite et al. |
| 6,909,921 | B1 | 6/2005 | Bilger |
| 6,912,429 | B1 | 6/2005 | Bilger |
| 7,092,772 | B2 | 8/2006 | Murray et al. |
| 7,437,596 | B2 | 10/2008 | McFarland |
| 7,486,193 | B2 | 2/2009 | Elwell |
| 7,555,658 | B2 | 6/2009 | Vahid et al. |
| 7,680,745 | B2 | 3/2010 | Hunter |
| 7,817,994 | B2 | 10/2010 | Funk et al. |
| 7,826,450 | B2 | 11/2010 | Lin et al. |
| 8,001,219 | B2 | 8/2011 | Moorer et al. |
| 8,013,732 | B2 | 9/2011 | Petite et al. |
| 8,023,440 | B2 | 9/2011 | Nass et al. |
| 8,050,801 | B2 | 11/2011 | Richards et al. |
| 8,155,142 | B2 | 4/2012 | Moorer et al. |
| 8,209,398 | B2 | 6/2012 | Moorer et al. |
| 8,271,881 | B2 | 9/2012 | Moorer et al. |
| 8,275,471 | B2 | 9/2012 | Huizenga et al. |
| 8,681,676 | B2 | 3/2014 | Budampati et al. |
| 8,725,845 | B2 | 5/2014 | Moorer et al. |
| 8,793,022 | B2 | 7/2014 | Uden |
| 8,806,209 | B2 | 8/2014 | Hemphill et al. |
| 9,036,560 | B2 | 5/2015 | Chen |
| 9,049,038 | B2 | 6/2015 | Cavalcanti |
| 9,210,192 | B1 | 12/2015 | Kim et al. |
| 9,374,874 | B1 | 6/2016 | Ewing |
| 9,455,802 | B2 | 9/2016 | Banks et al. |
| 9,820,361 | B1 | 11/2017 | Turvy, Jr. et al. |
| 9,867,260 | B2 | 1/2018 | Kicklighter et al. |
| 9,945,574 | B1 | 4/2018 | Sloo et al. |
| 10,057,062 | B2 | 8/2018 | Nadathur et al. |
| 10,143,067 | B1 | 11/2018 | Slupik et al. |
| 10,172,219 | B2 | 1/2019 | Turvy, Jr. et al. |
| 10,200,504 | B2 | 2/2019 | Decenzo et al. |
| 10,218,794 | B2 | 2/2019 | Slupik |
| 10,251,245 | B2 | 4/2019 | Roberts et al. |
| 10,333,731 | B2 | 6/2019 | Ebrom et al. |
| 10,339,791 | B2 | 7/2019 | Baum et al. |
| 10,359,746 | B2 | 7/2019 | Slupik et al. |
| 10,365,619 | B2 | 7/2019 | Mousavi et al. |
| 10,382,284 | B1 | 8/2019 | Slupik et al. |
| 10,382,452 | B1 | 8/2019 | Dawes et al. |
| 10,389,736 | B2 | 8/2019 | Dawes et al. |
| 10,542,610 | B1 * | 1/2020 | Slupik .................. G05B 15/02 |
| 10,754,304 | B2 | 8/2020 | Raji et al. |
| 10,834,802 | B2 | 11/2020 | Knauss et al. |
| 11,012,534 | B2 | 5/2021 | Andreola et al. |
| 11,234,106 | B2 | 1/2022 | Douglas et al. |
| 11,240,900 | B2 | 2/2022 | Knauss et al. |
| 2003/0040812 | A1 | 2/2003 | Gonzales et al. |
| 2003/0137396 | A1 | 7/2003 | Durej et al. |
| 2006/0028997 | A1 | 2/2006 | McFarland |
| 2006/0074494 | A1 | 4/2006 | McFarland |
| 2006/0208099 | A1 * | 9/2006 | Chapman .................. F24F 11/46 236/51 |
| 2007/0060147 | A1 | 3/2007 | Shin et al. |
| 2007/0156256 | A1 | 7/2007 | Jung |
| 2007/0232288 | A1 | 10/2007 | McFarland et al. |
| 2008/0191866 | A1 | 8/2008 | Falck et al. |
| 2008/0298302 | A1 | 12/2008 | Ishida |
| 2009/0032605 | A1 * | 2/2009 | Sullivan .................. F24F 11/30 236/46 R |
| 2009/0066473 | A1 | 3/2009 | Simons |
| 2009/0141741 | A1 | 6/2009 | Kim et al. |
| 2009/0222541 | A1 | 9/2009 | Monga et al. |
| 2010/0008272 | A1 | 1/2010 | Messinger et al. |
| 2010/0074234 | A1 | 3/2010 | Banks et al. |
| 2010/0236824 | A1 | 9/2010 | Roosli |
| 2011/0069665 | A1 | 3/2011 | Erdmann et al. |
| 2011/0080264 | A1 | 4/2011 | Clare et al. |
| 2011/0213867 | A1 | 9/2011 | McCoy et al. |
| 2012/0066168 | A1 | 3/2012 | Fadell et al. |
| 2013/0085615 | A1 | 4/2013 | Barker |
| 2013/0109406 | A1 | 5/2013 | Meador et al. |
| 2013/0132609 | A1 | 5/2013 | Meier |
| 2013/0285574 | A1 | 10/2013 | Garcia Morchon et al. |
| 2013/0291100 | A1 | 10/2013 | Ganapathy et al. |
| 2013/0335219 | A1 | 12/2013 | Malkowski |
| 2014/0107846 | A1 | 4/2014 | Li |
| 2014/0158337 | A1 * | 6/2014 | Kates ....................... F24F 11/46 236/51 |
| 2014/0163751 | A1 | 6/2014 | Davis et al. |
| 2014/0244044 | A1 | 8/2014 | Davis et al. |
| 2014/0293276 | A1 | 10/2014 | Hughes et al. |
| 2014/0328211 | A1 | 11/2014 | Holleis et al. |
| 2014/0336821 | A1 | 11/2014 | Blaine et al. |
| 2014/0358285 | A1 | 12/2014 | Aggarwal et al. |
| 2015/0347916 | A1 | 12/2015 | Warren et al. |
| 2016/0170389 | A1 | 6/2016 | Im et al. |
| 2016/0234186 | A1 | 8/2016 | Leblond et al. |
| 2016/0234649 | A1 | 8/2016 | Finnerty et al. |
| 2016/0327921 | A1 | 11/2016 | Ribbich et al. |
| 2016/0344670 | A1 | 11/2016 | Wu et al. |
| 2016/0381144 | A1 | 12/2016 | Malik et al. |
| 2017/0016643 | A1 | 1/2017 | Combe et al. |
| 2017/0034123 | A1 | 2/2017 | Ritmanich et al. |
| 2017/0094753 | A1 * | 3/2017 | Lunn ....................... H05B 47/18 |
| 2017/0118636 | A1 | 4/2017 | Zoorob |
| 2017/0171071 | A1 | 6/2017 | Turon |
| 2017/0231066 | A1 | 8/2017 | Roberts et al. |
| 2017/0289255 | A1 | 10/2017 | Urquhart et al. |
| 2017/0311415 | A1 | 10/2017 | Rozendaal et al. |
| 2018/0004178 | A1 | 1/2018 | Haines et al. |
| 2018/0027598 | A1 | 1/2018 | Roquemore, III et al. |
| 2018/0255506 | A1 | 9/2018 | Wang et al. |
| 2018/0310387 | A1 | 10/2018 | Turvy, Jr. et al. |
| 2019/0020494 | A1 | 1/2019 | Roosli |
| 2019/0190741 | A1 | 6/2019 | Wendt |
| 2019/0239033 | A1 | 8/2019 | Douglas et al. |
| 2019/0353383 | A1 * | 11/2019 | McCune .................. F24F 11/74 |
| 2019/0373706 | A1 | 12/2019 | Wang et al. |
| 2019/0379764 | A1 | 12/2019 | Andreola et al. |
| 2020/0068688 | A1 | 2/2020 | Knauss et al. |
| 2020/0389966 | A1 | 12/2020 | Amrine et al. |
| 2021/0084734 | A1 | 3/2021 | Knauss et al. |
| 2021/0218588 | A1 | 7/2021 | Skillermark et al. |
| 2021/0333007 | A1 * | 10/2021 | Conrad ..................... F24F 3/00 |
| 2022/0124897 | A1 | 4/2022 | Knauss et al. |
| 2024/0302824 | A1 * | 9/2024 | Alaghehband ... G05B 19/41845 |

OTHER PUBLICATIONS

European Patent Office Communication under Rule 71(3) EPC—Intention to Grant, EP application No. 19710234.6, dated Jan. 10, 2023.

Dandelski et al., Scalability of Dense Wireless Lighting Control Networks, Jan. 2015, IEEE Communications Magazine, vol. 53, No. 1, pp. 157-165, DOI: 10.1109/MCOM.2015.7010529 (Year: 2015).

Cordeiro et al., Multicast over Wireless Mobile Ad Hoc Networks: Present and Future Directions, Feb. 2003, IEEE Network, vol. 17, No. 1, p. 52-59, DOI: 10.1109/MNET.2003.1174178 (Year: 2003).

Related U.S. Appl. No. 17/480,486, Office action dated Oct. 27, 2022.

Related U.S. Appl. No. 17/070,220, Office action dated Apr. 13, 2023.

Related U.S. Appl. No. 17/070,220, Notice of Allowance dated Jul. 20, 2023.

Related U.S. Appl. No. 15/479,093, Notice of Allowance, Mar. 21, 2019.

(56) References Cited

OTHER PUBLICATIONS

Related U.S. Appl. No. 16/417,400, Office action issued on Sep. 3, 2019.
Related U.S. Appl. No. 15/910,338 Notice of Allowance, Apr. 18, 2019.
International Search Report, PCT/US2019/019365, date of mailing Jun. 25, 2019.
Written Opinion of the International Search Authority, PCT/US2019/019365, date of mailing Jun. 25, 2019.
Related U.S. Appl. No. 16/417,400, Notice of Allowance, Oct. 15, 2019.
Related U.S. Appl. No. 16/711,696, Office action dated Jul. 21, 2020.
Related U.S. Appl. No. 16/711,696, Notice of Allowance dated Aug. 28, 2020.
International Preliminary Report on Patentability, PCT/US2019/019365, date of mailing Sep. 8, 2020.
European Patent Office Rule 161 Communication, EP application No. 19710234.6, dated Oct. 13, 2020.
Related U.S. Appl. No. 16/453,879, Office action dated Mar. 3, 2021.
Related U.S. Appl. No. 16/453,879, Notice of Allowance dated Jul. 15, 2021.
Related U.S. Appl. No. 16/453,879, Notice of References Mar. 3, 2021.
Kastner, Wolfgang et al. "Communication Systems for Building Automation and Control", Jun. 6, 2005, IEEE, vol. 93, pp. 1178-1203.

* cited by examiner

NETWORKED SENSORS INTEGRATED WITH HEATING, VENTILATION, AND AIR CONDITIONING (HVAC) SYSTEMS

CROSS-REFERENCES TO OTHER APPLICATIONS

This application claims the benefit of U.S. Provisional Patent Application Ser. No. 63/221,075, which is incorporated by reference herein.

This application is related to: (i) U.S. Pat. No. 10,359,746, (ii) U.S. Pat. No. 10,218,794, and (iii) U.S. Pat. No. 10,382,284, all of which are incorporated by reference herein.

FIELD OF THE INVENTION

The present invention relates to building automation and control in general, and, more particularly, to a network of sensors integrated with and producing data to control a heating, ventilation, and air conditioning (HVAC) system.

BACKGROUND OF THE INVENTION

"Commercial building automation," or "commercial automation," refers to the use of computer and information technology to control commercial building systems, such as lighting, HVAC or "heating, ventilation, and air conditioning", audio-visual, smoke detection, security, and shading, among others. Using specialized hardware and control logic, building devices can monitor their environment and can be controlled automatically. Although commercial automation has been available at some level of sophistication for some time, it steadily becomes more practical, from both a technological and cost perspective.

A sophisticated commercial automation and control system might include sensors (e.g., of temperature, of light, of motion or occupancy, etc.), controllers (e.g., a general-purpose personal computer, a dedicated automation controller, etc.), and actuators or actors (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Lighting automation and control systems now exist in which luminaires that comprise sensors, lamps, and control logic are networked together, in what is sometimes referred to as "connected lighting" or networked "smart lighting." In such a network, sensors which can be standalone and/or integrated into the luminaire nodes collect data about the local environment, such as data related to occupancy in the vicinity of the luminaires. The networked luminaires communicate with one another, in some cases sharing the sensor data, and adjust the light output of the lamps via the control logic, with some level of coordination across the networked luminaires.

FIG. 1 depicts connected lighting network 100 in the prior art. Network 100 comprises smart nodes 101-1 through 101-M, wherein M is a positive integer (e.g., M being equal to 5 as depicted, etc.). As depicted in FIG. 1, the nodes are luminaires (denoted by "L"). Additionally, each of the luminaires comprises an occupancy sensor unit. The networked nodes communicate wirelessly with one another via transmitted signals 102-1, 102-2, 102-3, 102-4, and 102-5. The group of nodes can be situated within a building or other structure.

Network 100 is a mesh data network that enables communication among smart nodes 101-1 through 101-M. To this end, the nodes within network 100 distribute data (e.g., the packet-based messages, etc.) in accordance with Bluetooth mesh networking. A "mesh network" is a network topology in which each node relays data for the network. The nodes that are involved cooperate in the distribution of data in the network.

Being a mesh network, network 100 is an example of a distributed control system. Distributed control systems have some advantages over centralized control systems, including in some cases the elimination of a single point of failure and the reduction of processor load. Furthermore, technologies such as Bluetooth mesh networking can enable a single, published message to be processed by more than one network node; for example, each sensor data message can be acted upon by more than one node.

As mentioned above, commercial automation can also be applied to HVAC systems. Air conditioning within a commercial building can account for much higher energy consumption than the lighting within the same building, often ten times as much. Accordingly, the effective automation and control of an HVAC system can result in significant cost savings.

SUMMARY OF THE INVENTION

Air conditioning within a commercial building can account for much higher energy consumption than the lighting within the same building. This is because the air conditioning often continues to run even when there are no people within an area in the building. There have been various ways introduced in the prior art to handle this problem in general. In a home, for example, smart thermostats such as Nest™ provide an "auto-away" feature with a thermostat that senses the presence or absence of people within a room.

In commercial buildings, however, this approach can be limited in that a smart thermostat cannot overlook an entire commercial-sized room or space. Thus, the smart thermostat cannot reliably determine the presence or absence of people within the large space. And to the extent that a network of sensors is used, the occupancy information is typically provided to a central HVAC controller, which in turn attempts to make decisions on how to control the temperatures of the individual rooms based on the occupancy information. Typically, the implementation of this centralized control is complex and requires reprogramming or reconfiguring of the HVAC system, or both.

The present invention enables the enhanced control of an HVAC system within a building based on a networked smart lighting system existing within the building. In particular, a smart lighting system already having occupancy sensors to determine whether or not people are within each monitored space is capable of controlling a thermostat situated within the corresponding space. A controller unit of the illustrative embodiment is introduced that is configured to detect and act upon data packets transmitted by the occupancy sensors, in order to modify the control signals of the thermostat.

By doing so, the controller unit enables an "auto-away" feature that causes the thermostat to turn off the applicable air conditioning or heating unit (e.g., fan coil unit, etc.) associated with a space when people are no longer in the monitored space or spaces—that is, when no occupancy is sensed by the sensors. Advantageously, the controller unit of the illustrative embodiment leverages the occupancy sensors of an installed smart lighting system, and can control the thermostat with minimal, if any, modifications to the thermostat being required.

In accordance with an illustrative embodiment of the present invention, the sensors in a data network of occupancy sensors (i) sense occupancy in a first space, such as a room within a building, and (ii) transmit data packets. Each of the data packets comprises an indication whose value is based in part on whether occupancy is sensed or not in the first space. The thermostat is situated in the first space and provides a control signal onto an output line for controlling the HVAC unit (e.g., fan coil unit, etc.) dedicated to the first space, based on the temperature sensed by the thermostat. A controller unit comprises (i) a radio transceiver, capable of receiving the data packets, and (ii) a processor. The processor modifies the control signal on the output line of the thermostat, based in part on the value of the indication in the packets from at least one of the occupancy sensors.

Although the controller unit of the illustrative embodiment controls a thermostat by using sensors within a pre-existing smart lighting system, it will be clear to those who are skilled in the art, after reading this specification, how to make and use alternative embodiments that use sensors within a different type of networked system that comprises sensors.

An illustrative first system comprising: a data network of occupancy sensors, wherein at least some of the occupancy sensors are configured to (i) sense occupancy in a first space and (ii) transmit a first set of one or more packets, each of these packets comprising (a) a first indication whose value is based on whether occupancy is sensed or not in the first space and (b) a first group address; a first thermostat situated in the first space, the first thermostat being configured to provide a first control signal onto a first output line, based on temperature sensed by the first thermostat; and a first controller unit comprising: (i) a first radio transceiver, capable of receiving the one or more packets, and (ii) a first processor, wherein the first processor is configured to modify the first control signal on the first output line based on (a) the value of the first indication in the one or more packets from at least one of the occupancy sensors and (b) the first controller unit being subscribed to the first group address.

An illustrative second system comprising: a data network of occupancy sensors, wherein at least some of the occupancy sensors are configured to (i) sense occupancy in a first space and (ii) transmit a first set of one or more packets, each of these packets comprising (a) a first indication whose value is based on whether occupancy is sensed or not in the first space and (b) a first group address; a first thermostat situated in the first space, the first thermostat being configured to provide a first control signal onto a first output line, based on temperature sensed by the first thermostat; a first controller unit comprising: (i) a first radio transceiver, capable of receiving the one or more packets, and (ii) a first processor, wherein the first processor is configured to modify the first control signal on the first output line based on (a) the value of the first indication in the one or more packets from at least one of the occupancy sensors and (b) the first controller unit being subscribed to the first group address; and a first luminaire node comprising a lamp whose light output level is based, at least in part, on the value of the first indication from at least one of the occupancy sensors.

DETAILED DESCRIPTION

Figure 1:
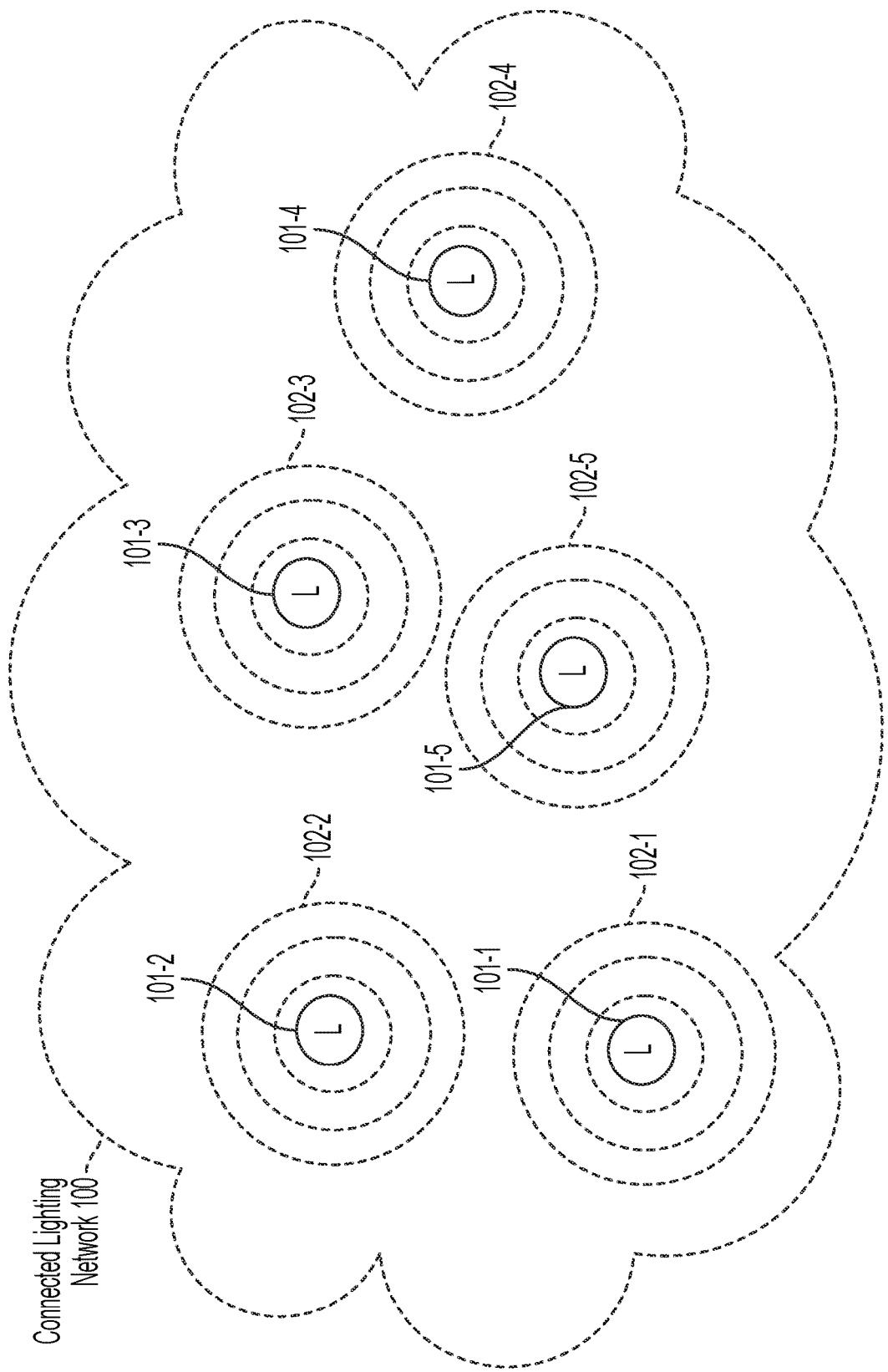
FIG. 1 depicts connected lighting network 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller Node—For the purposes of this specification, the term "controller node" is defined as a node in a data network and comprising a controller that is configured to control an actor unit by generating one or more output values that are used by the actor unit.

Sensor Node—For the purposes of this specification, the term "sensor node" is defined as a node in a data network comprising a sensor unit that is configured to monitor a physical condition and to report sensor data values of the physical condition.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp. A luminaire is an example of a controller node.

Network address—For the purposes of this specification, the term "network address," or "computer network address," is defined as a numerical label assigned to each device (e.g., sensor node, controller or actor node, configuring node, etc.) participating in a computer network. For example, an Internet Protocol address (IP address) is a numerical label assigned to each device participating in a computer network that uses the Internet Protocol for communication. A "source address" is an example of a network address, in that it specifies the device that originated a transmitted data packet or message conveyed by one or more packets.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Thermostat—For the purposes of this specification, the term "thermostat" is defined as device for sensing the temperature of a physical system and performing actions so that the system's temperature is maintained near a specified setpoint.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are known in the art are depicted in block diagram form in the accompanying figures in order to keep salient aspects of the present invention from being unnecessarily obscured.

Figure 2:
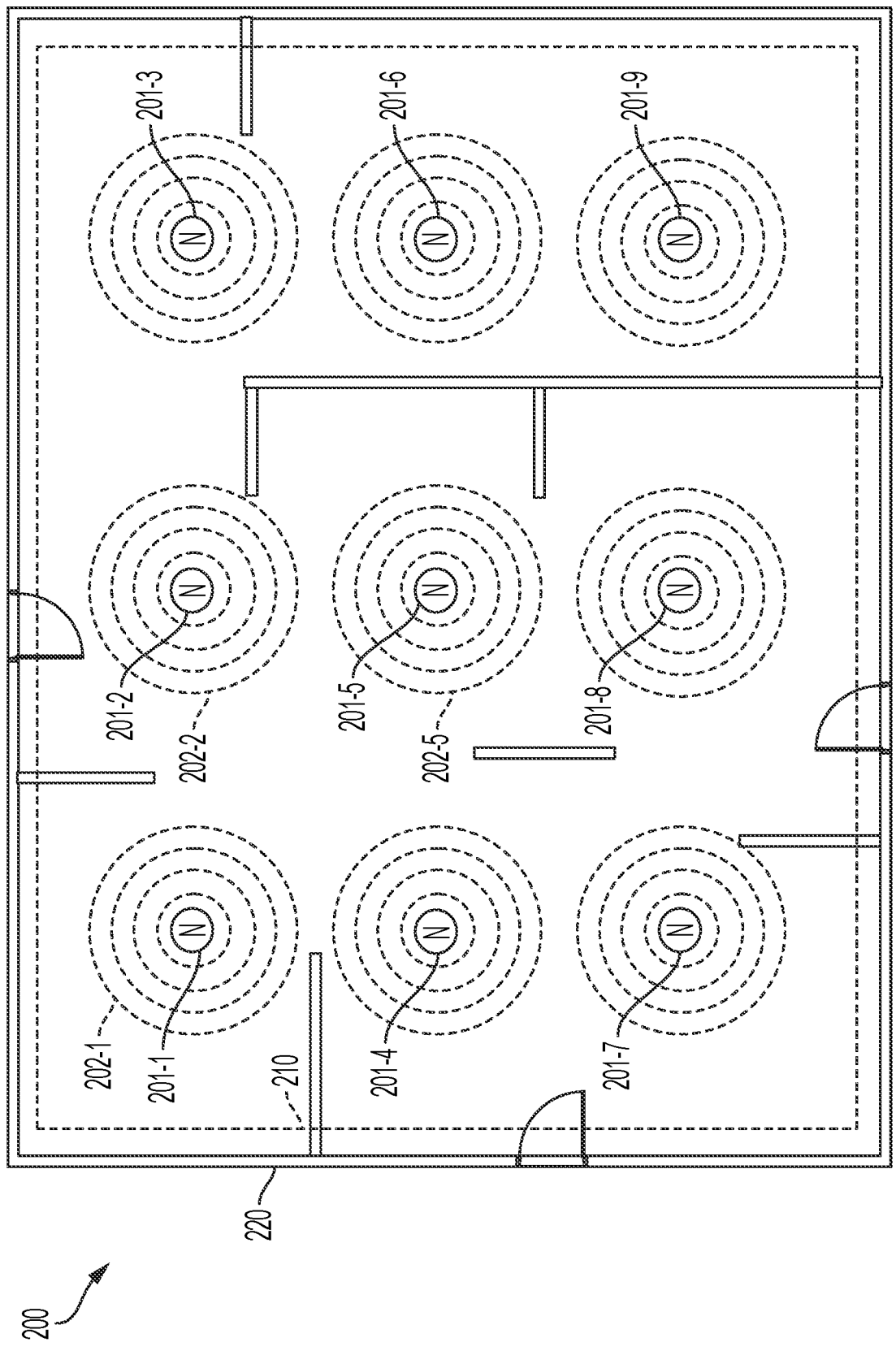
FIG. 2 depicts building control system 200 and mesh network 210 in accordance with the illustrative embodiment.

FIG. 2 depicts building control system 200 in accordance with the illustrative embodiment, which comprises network nodes 201-1 through 201-M (labeled with an "N" for "node"), wherein M is a positive integer (e.g., M equal to 9 as depicted, etc.) situated within building 220. Network nodes 201-1 through 201-M make up data network 210; as mesh nodes, they are provisioned devices that are, as a result, capable of operating within a mesh network.

Control system 200 is an example of a system having distributed logic. More particularly, in control system 200 of the illustrative embodiment, control functionality is distributed among the network nodes. Being equally privileged with one another, network nodes 201-1 through 201-M are peer devices to one another. With nodes 201-1 through 201-M operating as "smart nodes," control system 200 provides "connected lighting" or networked "smart lighting."

Data network 210 is a mesh network, as is known in the art, and enables communication among network nodes 201-1 through 201-M, wherein M is a positive integer (e.g., M equal to 9 as depicted, etc.). To this end, the nodes within network 210 distribute data (e.g., the packet-based messages, etc.) among one another in accordance with mesh networking. A "mesh network" is a network topology in which each node relays data for the network. The nodes that are involved cooperate in the distribution of data in the network. A mesh network can relay messages—for example, by using a flooding technique and/or a routing technique.

In accordance with the illustrative embodiment, mesh network 210 uses Bluetooth as the underlying radio technology to communicate among devices. As those who are skilled in the art will appreciate after reading this specification, network 210 can use a different radio technology than Bluetooth. The requirements to enable an interoperable mesh networking for Bluetooth wireless technology are defined in the Bluetooth Mesh Networking specifications, including the "Mesh Profile Specification," Revision v1.01, Jan. 21, 2019, which is incorporated by reference herein. Additional information is defined in the "Bluetooth Core Specification," Revision v5.3, which is incorporated by reference herein.

The Bluetooth wireless communication standard is typically employed for exchanging communications between fixed or mobile Bluetooth-enabled devices over short distances. In some configurations, the systems and methods disclosed herein may be applied to Bluetooth Low Energy (or "Bluetooth LE" or "BLE") devices. The BLE extension of the Bluetooth standard is focused on energy-constrained applications such as battery-operated devices, sensor applications, and so on.

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZigBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

Each mesh network node 201-$m$ (or "mesh node"), wherein m has a value between 1 and M, inclusive, is an apparatus that comprises memory, processing components, and communication components. In addition to communicating with other nodes, each mesh node is capable of performing one or more functions, as described below. Node 201-$m$ is described in detail below and in FIG. 3.

Mesh node 201-$m$ can be a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, an access terminal, a computer, a laptop computer, a desktop computer, a tablet computer, and so on, for example and without limitation.

From a data network perspective, the nodes within data network 210 are depicted according to how they are situated within building 220, according to a floor plan. As depicted in FIG. 2, at least some of nodes 201-1 through 201-M ("nodes 201") are luminaires. Each luminaire comprises a controller unit and an actor unit—in the illustrative embodiment, a luminaire with controller logic and comprising a controllable lamp as an actor unit. Additionally, at least some of nodes 201 further comprise an occupancy sensor unit that detects whether or not a person is present, wherein this occupancy is also referred to herein as a "first physical condition." The networked nodes communicate wirelessly with one another via transmitted signals 202-1, 202-2, and so forth, via network 210.

In some embodiments of the present invention, some, but not all, of mesh nodes 201 have an occupancy sensor unit present, while some, but not all, mesh nodes have a lamp (as an actor unit), while at least one mesh node is electrically connected to a thermostat as described below. In some embodiments, one or more of the mesh nodes might have a different kind of sensor unit for monitoring a different physical condition than occupancy (e.g., ambient light, etc.), instead of or in addition to an occupancy sensor unit, while in some other embodiments one or more of the mesh nodes might have a kind of actor unit present instead of, or in addition to, a lamp. The controlled function being performed by the actor unit might be something instead of, or in addition to, light level output. Furthermore, in some alternative embodiments of the present invention, one or more of the depicted elements can communicate via wired connections.

In one configuration, node 201-*m* transmits signals 202-*m* that convey control-related information, such as packet-based messages containing sensor values. In another configuration, node 201-*m* provides light at an output that is based, at least in part, on the content of one or more data packet messages received from one or more other luminaires (e.g., sensor data messages, etc.). In another configuration, node 201-*m* can also be configured to sense one or more physical conditions (e.g., illuminance, motion, occupancy, etc.) and can transmit (e.g., publish, etc.) messages based on the one or more physical conditions sensed. In another configuration, node 201-*m* can be electrically connected to a thermostat for the purposes of modifying the control function of the thermostat.

In accordance with the illustrative embodiment, nodes 201 constitute an automation and control system—more specifically, a networked lighting system—in a commercial building, such as an office space or a retail space. As those who are skilled in the art will appreciate after reading this specification, however, the luminaires can also be applied to a different type of building, such as a home, or to include the environment surrounding the building, or to any environment in which automated control can be applied.

Furthermore, building 220 can be a different type of structure with a roof and walls, or can instead be a defined area that comprises multiple sub-areas (e.g., open space, cubicles, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As depicted, nodes 201 are positioned uniformly in a grid-like pattern. However, as those who are skilled in the art will appreciate after reading this specification, the luminaires can be positioned in any geometry or geometries with respect to one another, provided that each luminaire is within communication range of one or more of the other luminaires.

Figure 3:
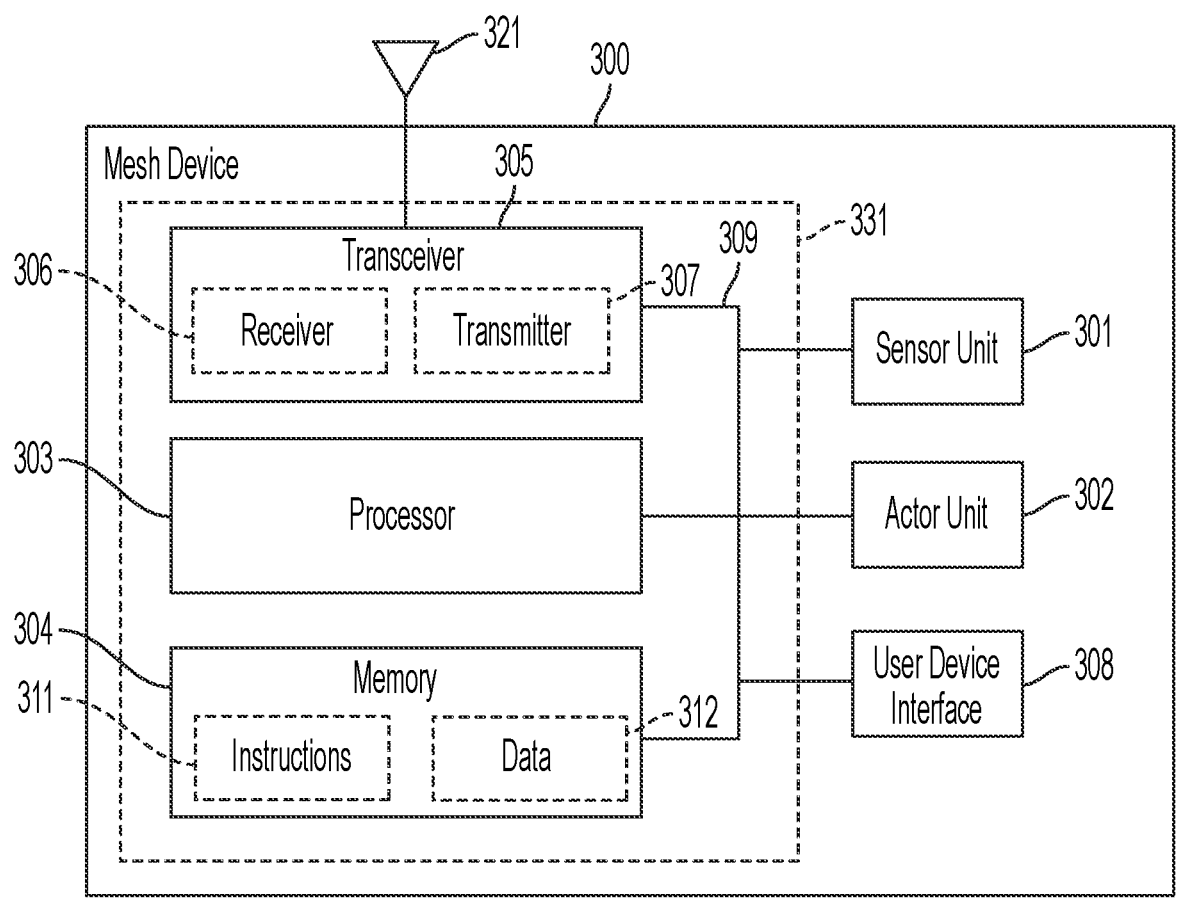
FIG. 3 depicts the salient components of mesh device 300 according to the illustrative embodiment.

FIG. 3 depicts the salient components of mesh device 300 according to the illustrative embodiment. Device 300 is based on a data-processing apparatus whose hardware platform comprises at least some of: sensor unit 301, actor unit 302, processor 303, memory 304, transceiver 305, and user device interface 308, interconnected as shown. Mesh device 300 is a device (e.g., a Bluetooth device, etc.) that is capable of being provisioned and thus becoming a mesh node and a member of mesh network 210. For example, the mesh device 300 can be provisioned as any of nodes 201-1 through 201-M of FIG. 2.

Various nodes within mesh network 210 can comprise different combinations of sensors, actors, processors, memory, and transceivers. For example, some nodes (e.g., controller nodes, etc.) within mesh network 210 can comprise a controllable lamp (i.e., an actor unit), a processor, a transceiver, and, optionally, a sensor unit (e.g., for sensing occupancy, for sensing ambient light, etc.), although some such nodes might not comprise a sensor unit. Some other nodes (e.g., sensor-only nodes, etc.) within mesh network 210, for example, can comprise a sensor unit, possibly a separate processor, and a transceiver, but not necessarily an actor unit (e.g., lamp, etc.). As those who are skilled in the art will appreciate after reading this specification, different configurations of mesh nodes are possible, wherein each node is based on one or more of the components that are described below.

Sensor unit 301 is an apparatus that comprises memory, processing components, and communication components, and is configured to gather information about the environment that is accessible by the sensor unit. Mesh device 300 can have one or more sensor units 301, wherein each sensor is configured to monitor a particular physical condition (e.g., temperature, illuminance of ambient lighting, humidity, motion, occupancy, etc.). In accordance with the illustrative embodiment, a first sensor unit 301 senses occupancy measured in terms of whether someone is present or not, and is included in some, but not necessarily all, of the nodes within mesh network 210.

Each sensor unit is configured to report a state of the condition by providing input signals to processor 303, wherein the values of the input signals are representative of the states being reported. A given sensor unit 301 can report discrete input signal values and/or a continuum of states and can report states at particular times and/or continuously. A change in state, which is determined by processor 303 as described below, can occur based one or more sensor units detecting changes in the following, in any combination:

i. environmental probes (e.g., temperature, ambient light, occupancy or motion, infrared signature, humidity, air quality, sound level, etc.).

ii. electrical inputs (i.e., binary, analog, bus), including from a switch.

iii. signals received via radio (e.g., proximity beacons, etc.).

iv. a state of the internal logic, woken up periodically based on time or on an external event.

For example and without limitation, a state change can correspond to a switch being actuated, occupancy being detected, a timer or counter reaching a predefined value, and so on.

Actor unit 302 is an apparatus that comprises memory, processing components, and communication components, and is capable of doing something in the course of being affected by signals originating externally to the actor component, such as from processor 303, as described in detail below. Mesh device 300 can have one or more actor units 302, wherein each actor unit acts upon its environment. In accordance with the illustrative embodiment, a first actor unit 302 is a lamp and is included in some, but not necessary all, of the nodes within mesh network 210.

Actor unit 302 is configured to receive, transmit, process, and/or relay signals conveying data, as well as being configured to affect a condition, physical or otherwise, in its environment. Actor unit 302 provides or performs a predetermined function, such as a lamp giving off light according to a configurable light output and controlled by a control signal generated by processor 303. For example and without limitation, the condition being affected can be:

i. lighting, which can be adjusted (e.g., turning on or off, changing light output, changing brightness, changing color or mood, changing illuminance, displaying a picture or pattern, etc.).

ii. sound, which can be adjusted (e.g., increasing or decreasing volume, changing playlist or mood, turning on/off, selecting signal source, etc.).

iii. room climate, which can be controlled (e.g., increasing or decreasing temperature, humidity, air fragrance, fan speed, etc.).

iv. an alert, which can be generated (e.g., of an email, of an SMS message, etc.).

v. monitoring by a camera, which can be panned or tilted.

vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).
  viii. virtual keyboard—navigation on virtual keyboard displayed by other device (e.g., video monitor, set-top box, etc.).
  ix. control of shades/window coverings/blinds.
  x. access control (e.g., unlocking/locking doors, opening/shutting doors, authorizing access to selected rooms or zones, etc.).

Furthermore, device 300 can comprise any combination of and any number of actor functions. As those who are skilled in the art will appreciate, after reading this disclosure, device 300 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 303 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. Processor 303 is capable of providing control signals for one or more purposes as described in this specification.

Figure 4:
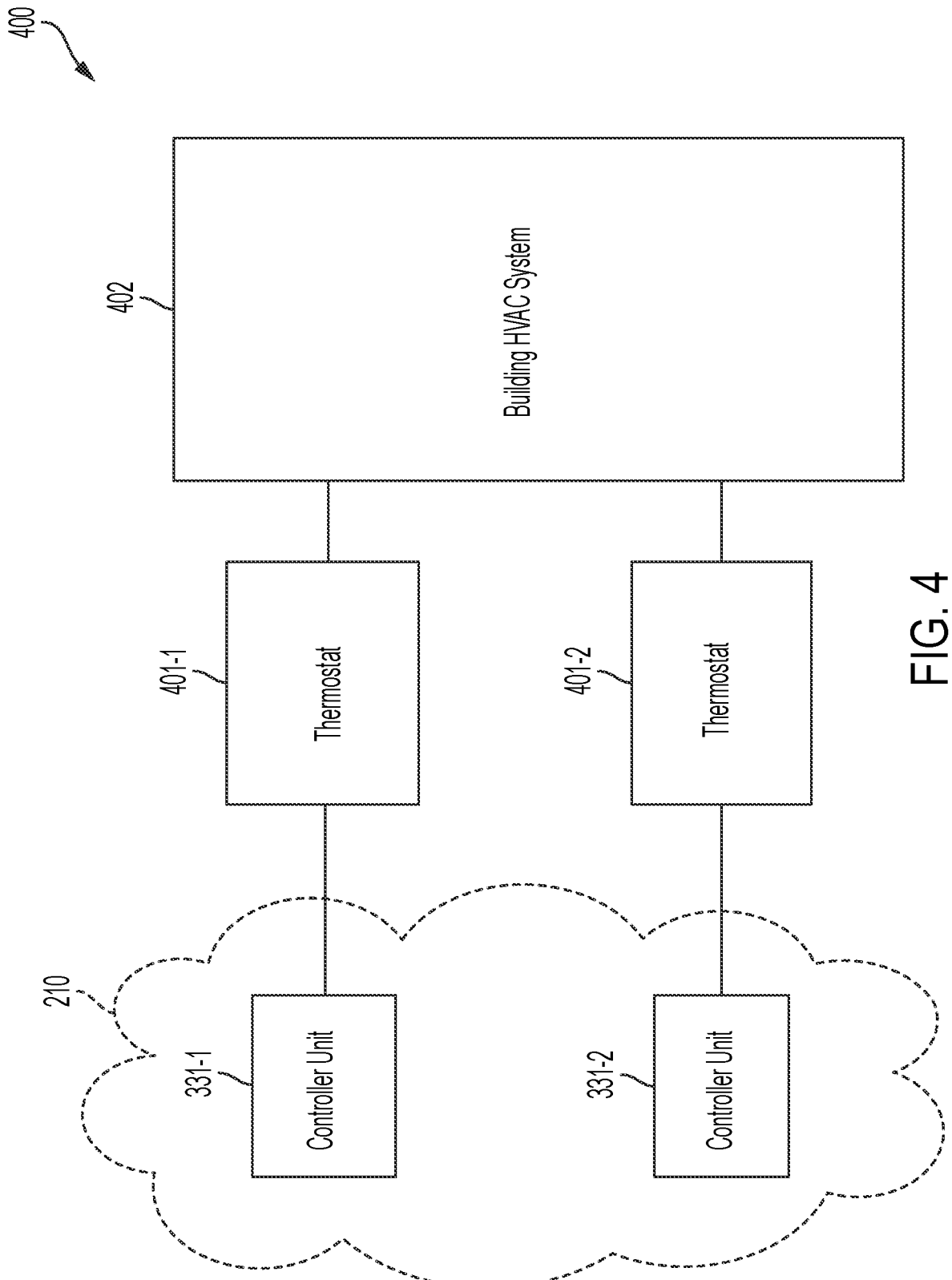
FIG. 4 depicts HVAC control system 400 in accordance with the illustrative embodiment.

Processor 303 is configured such that, when operating in conjunction with the other components of device 300, processor 303 executes software in the form of instructions 311, processes data in the form of data 312, and telecommunicates according to the operations described herein, including at least some of those depicted in FIG. 4 and other flow diagrams. Processor 303 can be referred to as a "central processing unit" (CPU). Although just a single processor 303 is shown as part of mesh device 300 of FIG. 3, in an alternative embodiment a combination of processors (e.g., an ARM and DSP) can be used.

Processor 303, and memory 304 and transceiver 305 described below, constitute controller unit 331. In some embodiments of the present invention, controller unit 331 is a system on a chip (SoC) such as, but not limited to, an nRF52832 integrated circuit (IC) by Nordic Semiconductor.

Memory 304 is non-transitory and non-volatile computer storage memory technology that is known in the art. Memory 304 is in electronic communication with processor 303 (i.e., the processor can read information from and/or write information to the memory). Memory 304 can be any electronic component capable of storing electronic information. Memory 304 can be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Memory 304 is configured to store an operating system, application software in the form of instructions 311, and a database in the form of data 312. The operating system is a collection of software that manages device 300's hardware resources and provides common services for computer programs, such as those that constitute the application software.

The application software that is executed by processor 303 according to the illustrative embodiment enables device 300 to perform the functions disclosed herein. Instructions 311 that constitutes the application software can include one or more programs, routines, sub-routines, functions, procedures, code, and so on. The instructions may include a single computer-readable statement or many computer-readable statements. Instructions 311 may be executable by processor 303 to implement the methods disclosed herein. Executing the instructions may involve the use of the data 312 that is stored in memory 304. When processor 303 executes instructions 311, various portions of the instructions can be loaded onto processor 303, and various pieces of data 312 can be loaded onto processor 303.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Radio transceiver 305, which is a communication interface, is configured to enable device 300 to telecommunicate with other devices and systems, including other mesh network nodes, by receiving signals therefrom and/or transmitting signals thereto via receiver 306 and transmitter 307, respectively. Transceiver 305 communicates in accordance with Bluetooth mesh networking. In some other embodiments, transceiver 305 communicates via one or more other radio telecommunications protocols other than or in addition to Bluetooth mesh networking, as described earlier.

Receiver 306 is a component that enables device 300 to telecommunicate with other components and systems by receiving signals that convey information therefrom and through antenna 321. It will be clear to those having ordinary skill in the art how to make and use alternative embodiments that comprise more than one receiver 306.

Transmitter 307 is a component that enables device 300 to telecommunicate with other components and systems by transmitting signals that convey information thereto and through antenna 321. It will be clear to those having ordinary skill in the art how to make and use alternative embodiments that comprise more than one transmitter 307.

In some embodiments of the present invention, transceiver 305 is implemented on hardware that is physically distinct from that of processor 303, while in some other embodiments transceiver 305 is implemented on the same hardware (IC) as processor 303.

As depicted, mesh device 300 has a single transceiver 305. As those who are skilled in the art will appreciate after reading this specification, mesh device 300 can have multiple transceivers. Furthermore, each transceiver 305 can have one or more receivers 306 and/or one or more transmitters 307.

In some embodiments of the present invention, mesh device 300 also comprises user device interface 308. Interface 308 enables a user to interact with mesh device 300 and can comprise a touchscreen, a keyboard, a pointing device, a display, and so on, for example and without limitation.

The various components of mesh device 300 can be coupled together by one or more buses, which may include a power bus, a control signal bus, a status signal bus, a data bus, and so on. For purposes of clarity, the various buses are illustrated collectively in FIG. 3 as bus system 309.

FIG. 4 depicts HVAC control system 400 in accordance with the illustrative embodiment, which comprises data network 210, controller units 331-1 through 331-P, wherein P is a positive integer (e.g., P equal to 2 as depicted, etc.), thermostats 401-1 through 401-P, and building HVAC system 402. In some embodiments of the present invention, controller units 331-1 through 331-P are components within a subset of nodes 201 (e.g., nodes 201-1 through 201-P, etc.).

As described earlier and in regard to FIG. 2, data network 210 comprises nodes having occupancy sensor units. Within this specification and the claims, nodes within network 210 that have occupancy sensor units are referred to as "occupancy sensors." The coverage of the occupancy sensors can span one or more physically distinct spaces within building 220, such as a first room, a second room, and so on. The occupancy sensors publish occupancy information on the various spaces within building 220.

Controller unit 331-*p*, wherein p has a value between 1 and P, inclusive, is configured to modify a control signal of thermostat 401-*p*. The thermostat control signal is present on the thermostat's output control line as described below. Controller unit 331-*p* is configured to modify the control signal of the corresponding thermostat based on occupancy indications received in packets transmitted by one or more sensors within data network 210. In some embodiments, the control signal can be modified based on other indications received in the packets, such as ambient light indications, environmental indications (e.g., temperature, humidity, etc.), or indications stemming from any other physical condition sensed by one or more nodes within network 210, as described earlier.

Thermostat 401-*p* is configured to provide a control signal to building HVAC system 402 via an output control line, wherein the control signal is based on the temperature sensed by the thermostat. Each thermostat, via its corresponding controller unit, can be subscribed to information being published by sensors, such as to occupancy information being published by occupancy sensors, and pertinent to different spaces.

In accordance with the illustrative embodiment, the output control line of thermostat 401 is the COOL line of the thermostat control board—that is, for controlling the cooling function. In some embodiments of the present invention, the output control line can be the HEAT line or the FAN line—that is, for controlling the heating or fan-related functions (e.g., on/off, fan speed, etc.), respectively. In some other embodiments of the present invention, the output control line can be for controlling a different environmental condition than temperature (e.g., humidity, purity of the air, etc.). Thermostat 401 is described below and in regard to FIG. 5, including its control board.

In accordance with the illustrative embodiment, thermostat 401-*p* and corresponding controller unit 331-*p* are discrete units having separate packaging. The thermostat and controller unit can be manufactured potentially by different manufacturers and sold separately. Alternatively, they can be packaged together, and by the same manufacturer or assembler.

Building HVAC system 402, as is known in the art, accepts control signals from one or more thermostats 401-*p* and uses the control signals to control the temperature of the air of one or more spaces within building 220. In accordance with the illustrative embodiment, one or more fan coil units (FCU) are dedicated to the particular space in which thermostat 401-*p* is situated and are controlled by thermostat 401-*p*, which, in turn, is controlled by controller unit 331-*p*.

In some embodiments of the present invention, building HVAC system 402 can also control one or more other environmental conditions within building 220, such as humidity and purity of the air. In some embodiments of the present invention, the air quality within building 220, in terms of temperature, humidity, and/or purity, can be controlled by more than one building HVAC system 402. In such embodiments, a subset of thermostats 401-1 through 401-P provides control signals to a first HVAC system, a different subset of thermostats 401-1 through 401-P provides control signals to a second HVAC system, and so on.

Figure 5:
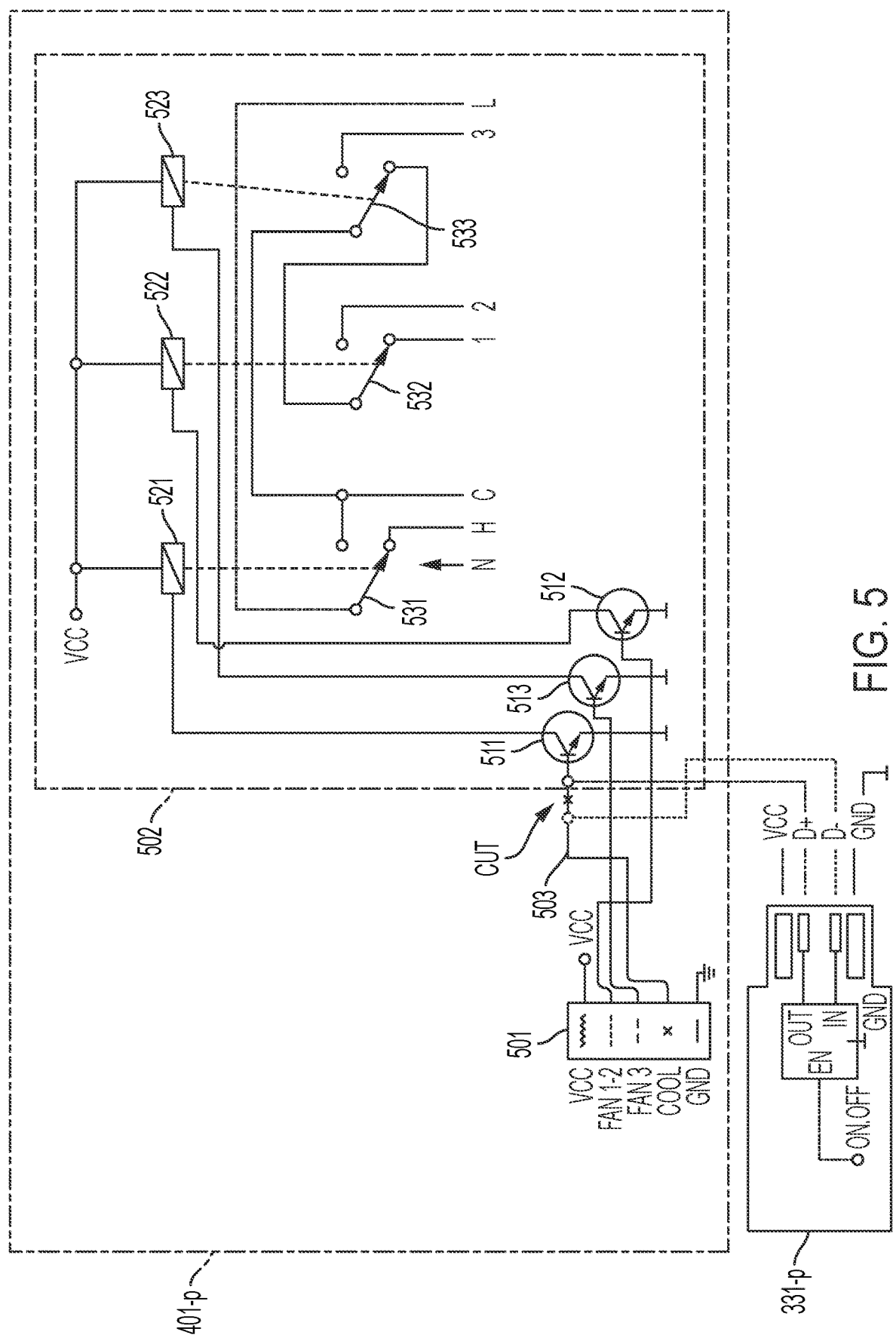
FIG. 5 depicts thermostat 401 comprising sensing-and-control component 501 and actuator component 502.

FIG. 5 depicts thermostat 401-*p* comprising sensing-and-control component 501 and actuator component 502. Sensing-and-control component 501 of thermostat 401 comprises COOL, HEAT, and FAN control switches, a temperature sensor, and a processor. Based on signals from the control switches and temperature sensor, the processor of component 501 provides a control signal on output control line 503 to drive actuator component 502. Actuator component 502 comprises transistors 511, 512, and 513, relay coils 521, 522, and 523, and switches 531, 532, and 533, interconnected as shown. It will be clear to those skilled in the art, after reading this specification, how to make and use thermostat 401.

In accordance with the illustrative embodiment, thermostat 401-*p* is also externally controlled by controller unit 331-*p*. The controller unit is depicted in FIG. 5 as a dongle comprising (i) an SoC (illustratively, an nRF52832 chip) with an ON_OFF GPIO (general-purpose I/O) pin and (ii) a high-side load switch (illustratively, an AP22811 chip) for driving thermostat 401-*p*. The dongle is depicted in additional detail in FIG. 6. The load switch is depicted in additional detail in FIG. 7.

Thermostat 401-*p* can be an off-the-shelf device having an output control line 503 that is capable of being interrupted in the manner described here. In some embodiments of the present invention, the depicted dongle is provided with power supply voltage (VCC) and ground (GND) from thermostat 401.

In accordance with the illustrative embodiment, thermostat 401-*p* is adapted by cutting output control line 503 (e.g., at the "CUT" position) and tying the resulting first and second ends of the cut output line to control lines D+ and D− that are electrically connected to controller unit 331-*p*. Output control line 503 is considered to be uninterrupted when the controller unit is in a normal operating state. In contrast, outline control line 503 is considered to be interrupted when controller unit 331-*p* receives packets from the sensors in data network 210 that contain a predetermined indication (e.g., no occupancy being sensed, etc.) as described below and in method 800.

Figure 6:
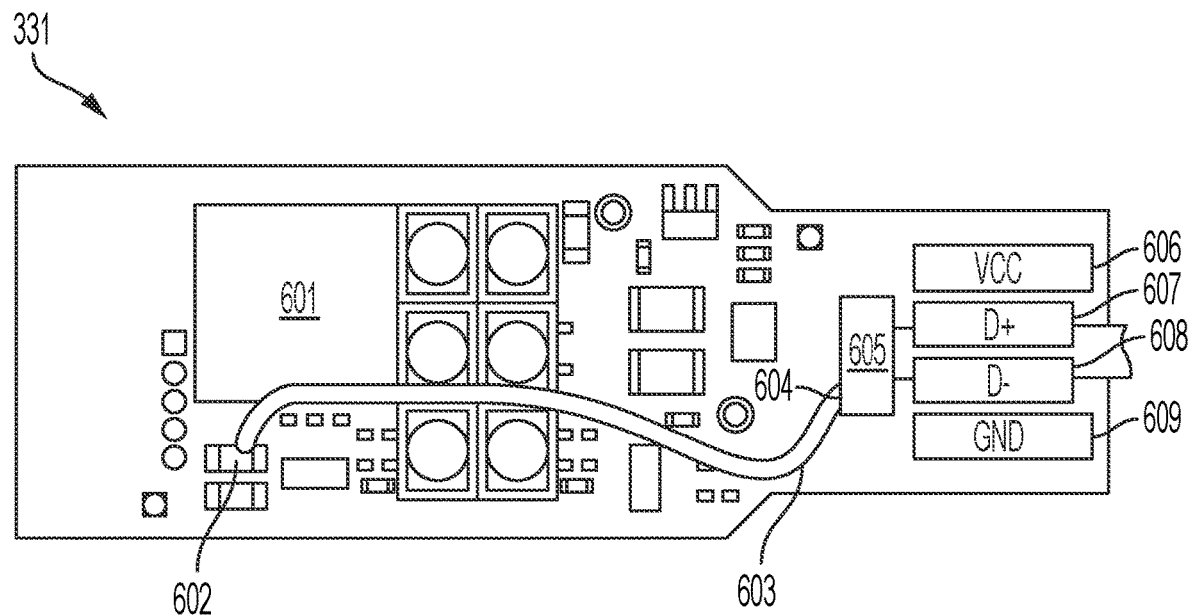
FIG. 6 depicts an embodiment of controller unit 331 in the form of hardware that is pluggable into thermostat 401.

FIG. 6 depicts an embodiment of controller unit 331 in the form of a dongle, or other piece of computer hardware, that is pluggable into thermostat 401. SoC 601, in the form of an nRF52832 chip, provides a controlling signal to ON OFF pin 602 based on (i) the value of the indication in the one or more packets from at least one of the occupancy sensors in data network 210 and (ii) Soc 601 being subscribed to a predetermined group address. Pin 602 is electrically connected via line 603 to ENABLE pin 604 of load switch 605. Load switch 605 is electrically connected to D+ and D− lines 607 and 608. Controller unit 331 is provided power and ground via pins 606 and 609, respectively.

Figure 7:
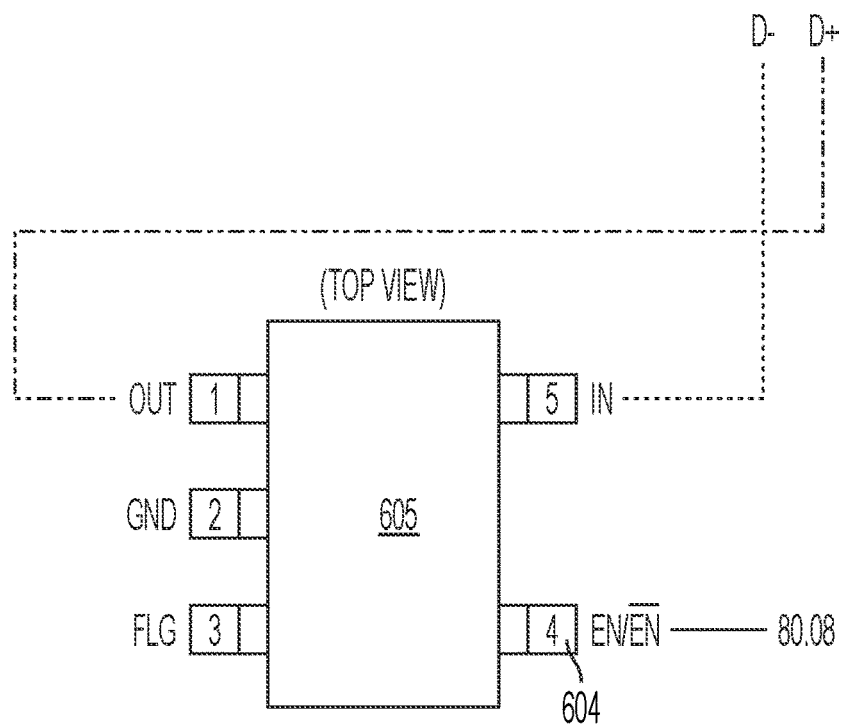
FIG. 7 depicts an embodiment of load switch 605.

FIG. 7 depicts an embodiment of load switch 605 in the form of an AP22811 chip. Load switch 605 uses the ENABLE pin connected to line 603 to drive D+ and D− pins 607 and 608.

Figure 8:
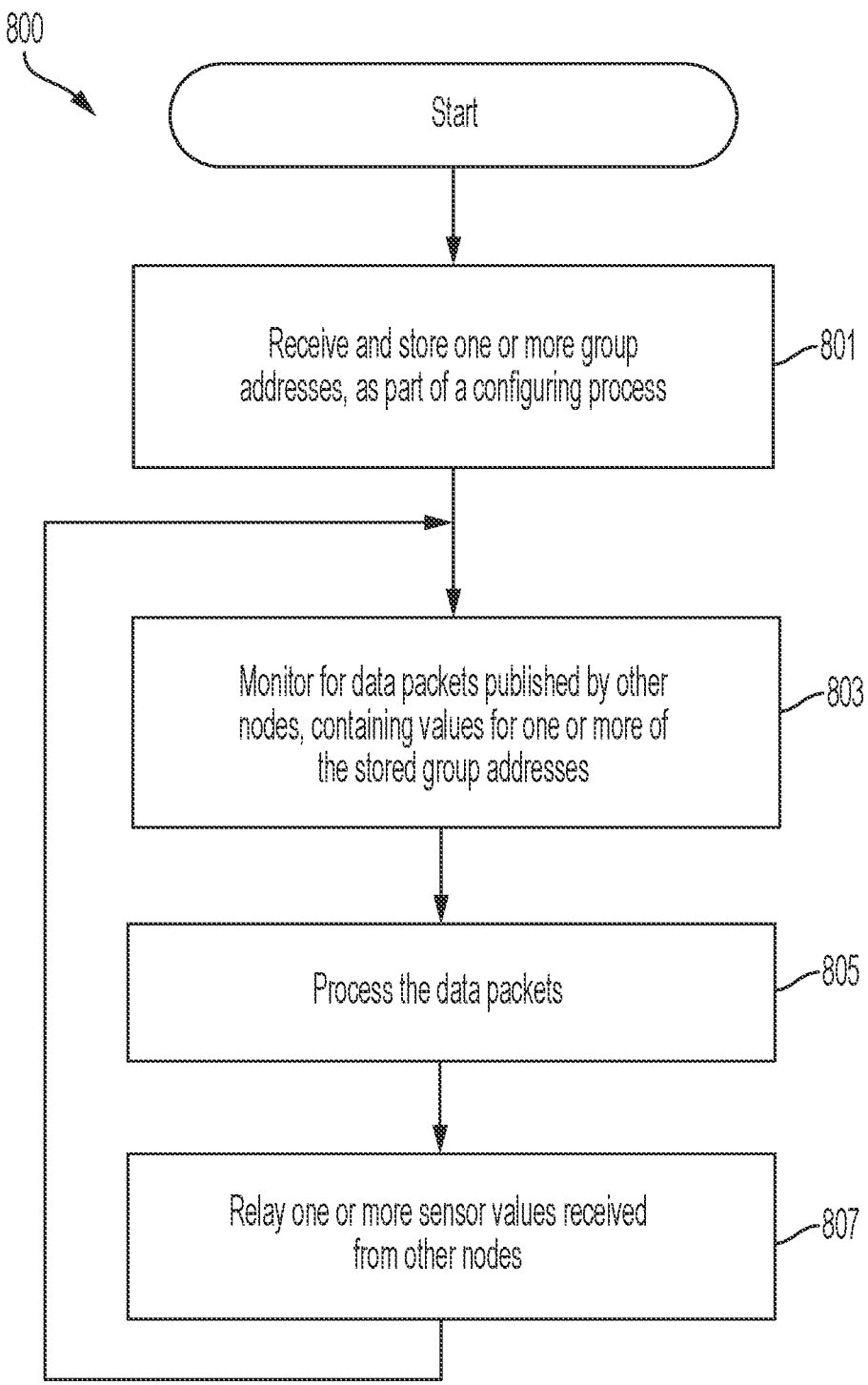
FIG. 8 depicts salient operations of method 800 according to the illustrative embodiment, by which each node 201-$m$ performs various functions in view of sensor values being published within mesh network 210.

Overall Operations of Node 201-*m*: FIG. 8 depicts salient operations of method 800 according to the illustrative embodiment, by which each node 201-*m* performs various functions related to the coordination of its own actions, in view of sensor values being published by sensor nodes within mesh network 210.

In regard to method 800, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

For illustrative purposes, node 201-5 in FIG. 2 is described as performing the operations described below and in the subsequent figures, particularly in regard to the operations of controller unit 331-5 configured to modify a control signal of thermostat 401-5. As those who are skilled in the art will appreciate, after reading this specification, one or more other nodes, instead of or in addition to node 201-5, can perform all of the described operations; furthermore, multiple nodes can perform concurrently the described operations.

In accordance with operation 801, node 201-5 receives signals that convey one or more group addresses and stores the one or more group addresses, as part of a configuring process. U.S. Pat. Nos. 10,359,746 and 10,382,284 are incorporated by reference herein and describe respectively how one or more mesh nodes are organized according to spaces within a building and how the one or more mesh nodes are organized by group addresses. For the purposes of this disclosure, nodes 201-1 through 201-M are organized into zones defined by one or more group addresses according to FIG. 9. A zone can be representative of a space or can be representative of something else. In storing each group address and being configured to subsequently monitor for the stored group address, it is said that node 201-5 subscribes to (e.g., by its processor, by its controller unit, etc.), or is subscribed to, the group address.

Figure 9:
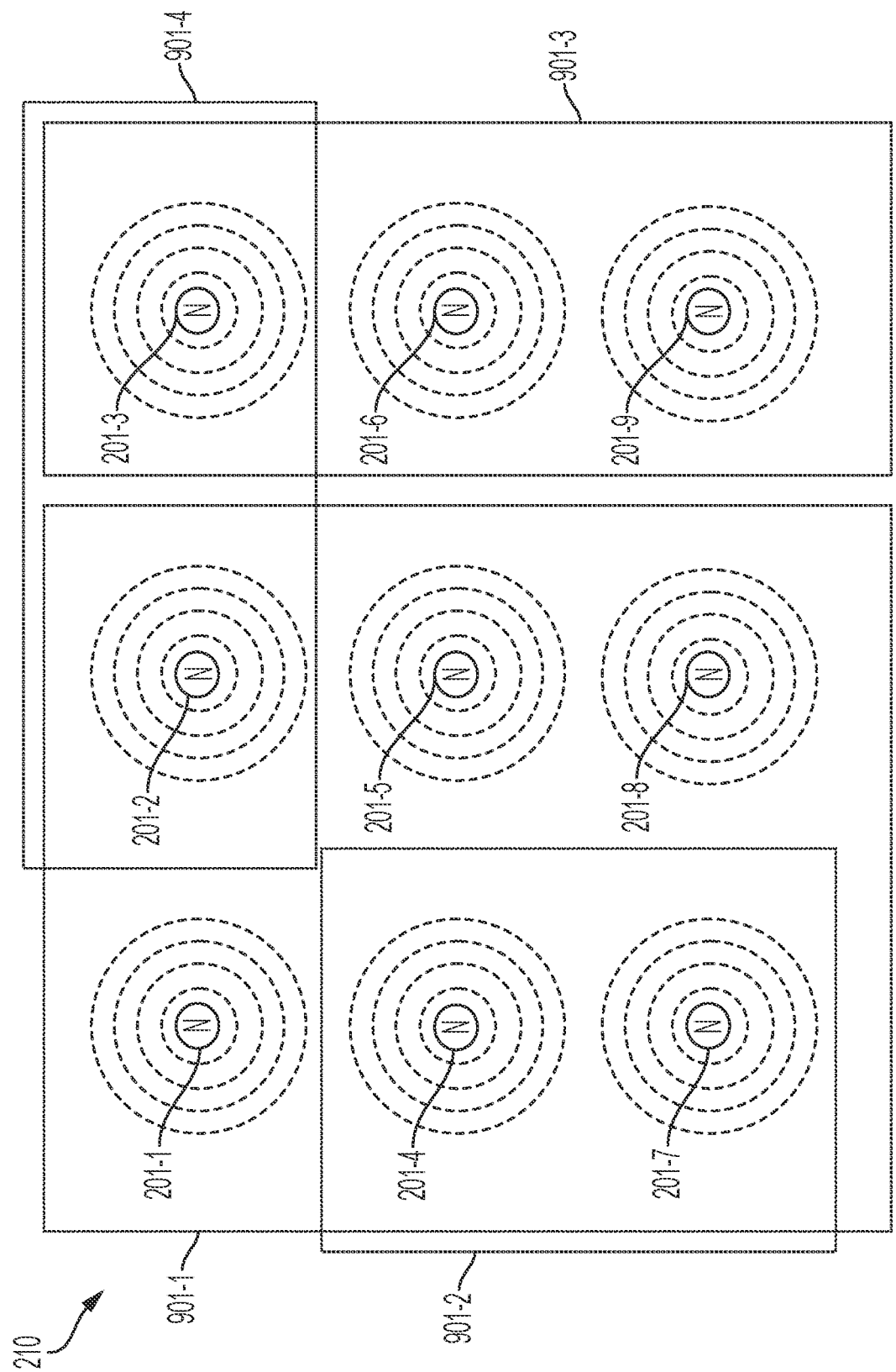
FIG. 9 depicts nodes 201-1 through 201-M in mesh network 210 organized into group addresses.

FIG. 9 depicts nodes 201-1 through 201-M in mesh network 210 organized into group addresses that correspond to zones 901-1 through 901-4. As depicted, some of the zones are overlapping with respect to one another, while some of the zones are non-overlapping with respect to one another. Specifically, nodes 201-1, 201-2, 201-4, 201-5, 201-7, and 201-8 are part of zone 901-1 corresponding to a first group address. Nodes 201-4 and 201-7 are part of zone 901-2 corresponding to a second group address; as depicted, zone 901-2 is a subarea of zone 901-1. Nodes 201-3, 201-6, and 201-9 are part of zone 901-3 corresponding to a third group address. Nodes 201-2 and 201-3 are part of zone 901-4 corresponding to a fourth group address; as depicted, zone-901-4 overlaps with subareas of zones 901-2 and 901-3.

As those who are skilled in the art will appreciate after reading this specification, Nodes 201-1 through 201-M can be organized differently than depicted, and any node can be a member of one or more groups that are respectively identified by one or more group addresses. Furthermore, two or more zones can be overlapping or non-overlapping with respect to one another, in any combination.

Thermostat 401-5, being controlled by controller unit 331-5 of node 201-5, is situated somewhere in zone 901-1 (e.g., a first space) as depicted. A second thermostat can be situated somewhere in a second zone (e.g., a second space) that is overlapping or non-overlapping with zone 901-1. For example, a second thermostat can be controlled by the controller unit of node 201-4 in zone 901-2 that is overlapping with zone 901-1. As another example, a third thermostat can be controlled by the controller unit of node 201-9 in zone 901-3 that is non-overlapping with zone 901-1.

In accordance with operation 803, node 201-5 monitors for published messages that contain values for one or more of the group addresses stored in accordance with operation 801.

In accordance with operation 805, node 201-5 processes one or more published messages that contain the values being monitored for in accordance with operation 803. Operation 805 is described below and in regard to FIG. 10.

In accordance with operation 807, and in accordance with mesh network protocol, node 201-5 relays one or more published messages that contain the sensor values received from other nodes, so that other nodes may receive the sensor values.

After operation 807, control of task execution proceeds back to operation 803, to detect and process sensor values that are being published by sensor nodes within network 210.

Figure 10:
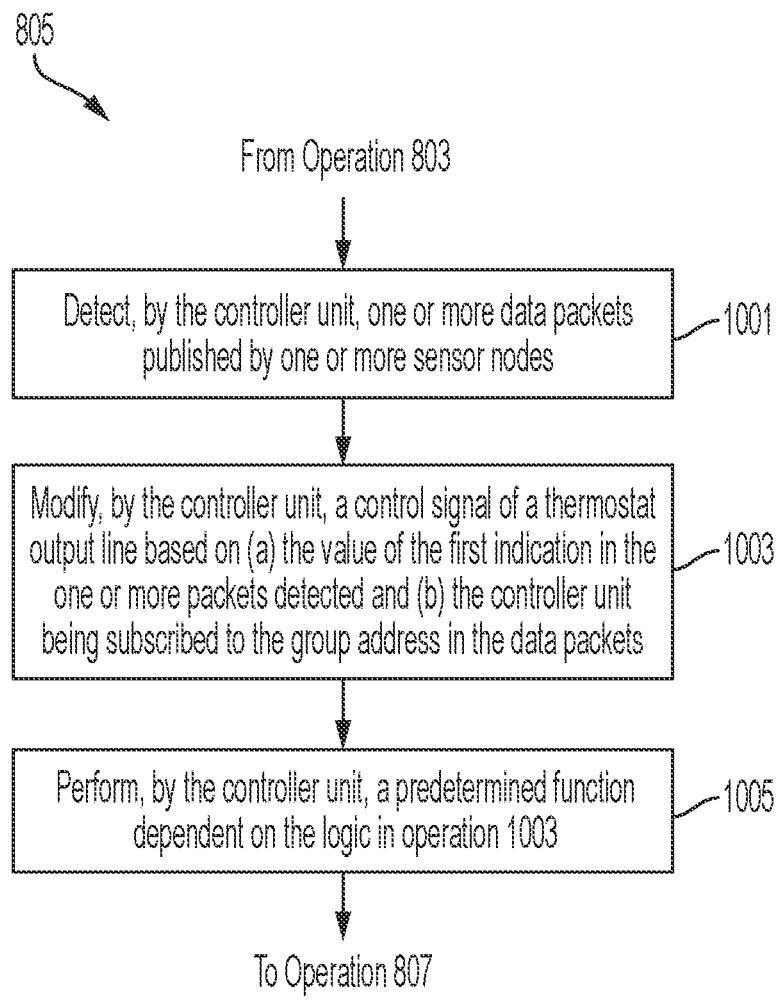
FIG. 10 depicts salient sub-operations in operation 805 of method 800.

Operations of Node 201-m in Processing Sensor Values: FIG. 10 depicts salient sub-operations in operation 805 according to the illustrative embodiment, by which node 201-5 performs various functions related to processing sensor values—that is, indications whose values are based on whether predetermined physical conditions are sensed or not. The sensor values are published in data packets by other nodes within data network 210, wherein a data-packet message to be processed by node 201-5 contains a group address that matches a group address stored in accordance with operation 801 (i.e., that is subscribed to by node 201-5).

In accordance with operation 1001, node 201-5 detects one or more data packets containing sensor values published by sensor nodes, along with one or more group addresses identified. In accordance with the illustrative embodiment, node 201-5 acts on a published sensor value only if a group address that is contained in the same message as the sensor value matches a group address stored in node 201-5's memory in accordance with operation 801.

In accordance with operation 1003, controller unit 331-5 of node 201-5 modifies a control signal of thermostat 401-5's output control line 503 based on (a) the value of an indication of a first physical condition—in this case, occupancy—in the one or more packets published by the sensors and detected in accordance with operation 1001 and (b) the group address matching as described above and in operation 1001.

In some embodiments of the present invention, controller unit 331-5 of node 201-5 modifies a control signal of thermostat 401-5's output control line 503 based on the value of an indication of a second physical condition (e.g., ambient illuminance, etc.) in the one or more packets published by sensors and detected in accordance with operation 1001.

Some additional non-limiting examples of how node 201-5 can use one or more subscribed-to group addresses to modify the thermostat control signal are provided here. In some embodiments of the present invention, the thermostat control signal is modified only if a first group address is both a) detected in a first data packet containing a first sensor value (e.g., of a first physical condition, etc.) and second data packet containing a second sensor value (e.g., of the first physical condition, of a second physical condition, etc.) and b) subscribed to by the first controller node.

In some embodiments of the present invention, the thermostat control signal is modified based on a predetermined sequence of sensor values; furthermore, each sensor value in the predetermined sequence can be required to originate from a particular sensor node, possibly in a combination of multiple sensor nodes. For example and without limitation, a predetermined sequence that is representative of a pattern of a person or persons heading in a particular direction within a space or across spaces, suggesting that people are leaving an area, can be used to interrupt the output control line of a thermostat situated within the area.

In those embodiments in which node 201-5 is subscribed to a single group address to which multiple sensors publish, sensors are discriminated by their source addresses. In those embodiments in which node 201-5 is subscribed to multiple group addresses, sensors are discriminated by the group each sensor publishes to and/or their source addresses. U.S. Pat. No. 10,218,794 is incorporated by reference herein and describes how the controller node can, in general, base its decision-making on discriminating across the different source addresses in the published data packet messages.

As those who are skilled in the art will appreciate after reading this specification, operation 1003 can be performed when needed, periodically or sporadically, based on absolute time (e.g., every J milliseconds, etc.), or based on activity related to a different operation (e.g., every K relevant sensor values that are detected in operation 1001, etc.), or both.

In accordance with operation 1005, node 201-5 performs a predetermined function (e.g., adjusting lighting, etc.) involving its actor unit 302 (e.g., a lamp, etc.) and also dependent on the same logic described above and in accordance with operation 1003 that is also used to modify the thermostat control signal.

After operation 1005, control of task execution proceeds to operation 807.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
 a data network of occupancy sensor nodes, wherein each node in a first subset of the occupancy sensor nodes is configured to (i) sense occupancy in a first space and (ii) transmit packets wirelessly, the packets being in a first set of packets, each of the packets in the first set comprising (a) a first indication whose value is based on whether or not occupancy is sensed in the first space and (b) a first group address, and wherein each node in a second subset of the occupancy sensor nodes is configured to (i) sense occupancy in a second space and (ii) transmit packets wirelessly, the packets being in a second set of packets, each of the packets in the second set comprising (a) a second indication whose value is based on whether or not occupancy is sensed in the second space and (b) a second group address;
 a first thermostat situated in the first space, the first thermostat being configured to provide a first control signal onto a first output line, based on temperature sensed by the first thermostat;
 a first controller unit comprising:
  (i) a first radio transceiver, capable of receiving packets comprising the first indication, and
  (ii) a first processor, wherein the first processor is configured to modify the first control signal on the first output line based on (a) the value of the first indication and (b) the first controller unit being subscribed to the first group address;
 a first fan coil unit (FCU) dedicated to the first space and controlled by the first control signal as modified by the first controller unit;
 a second thermostat situated in the second space, the second thermostat being configured to provide a second control signal onto a second output line, based on temperature sensed by the second thermostat;

a second controller unit comprising:
    (i) a second radio transceiver, capable of receiving packets comprising the second indication, and
    (ii) a second processor, wherein the second processor is configured to modify the second control signal on the second output line based on (a) the value of the second indication and (b) the second controller unit being subscribed to the second group address; and
  a second fan coil unit dedicated to the second space and controlled by the second control signal as modified by the second controller unit.

2. The system of claim 1, wherein the first processor is configured to modify the first control signal on the first output line, by interrupting the first output line based on the value of the first indication.

3. The system of claim 2, wherein the first processor is configured to interrupt the first output line based on no occupancy being sensed.

4. The system of claim 1, wherein the second processor is configured to modify the second control signal on the second output line, by interrupting the second output line based on the value of the second indication.

5. The system of claim 1, wherein the first space and the second space are non-overlapping.

6. The system of claim 1, wherein the first space and the second space overlap each other.

7. The system of claim 1, further comprising a luminaire node, the luminaire node comprising:
  (i) a third radio transceiver, capable of receiving packets comprising the first indication,
  (ii) a third processor, wherein the third processor is configured provide a third control signal based on (a) the value of the first indication and (b) the luminaire node being subscribed to the first group address, and
  (iii) a lamp whose light output level is based on the third control signal.

8. The system of claim 7, the luminaire node further comprising a first occupancy sensor unit, wherein the luminaire node is further configured to (i) sense occupancy in the first space via the first occupancy sensor unit and (ii) transmit packets wirelessly, the packets being in the first set; wherein the light output level of the lamp is further based on whether or not occupancy is sensed by the first occupancy sensor unit.

9. The system of claim 1, wherein the first thermostat and the first controller unit are discrete units.

10. The system of claim 1, wherein the first thermostat and the first controller unit are packaged together.

11. A system comprising:
  a data network of occupancy sensor nodes, wherein each node in a first subset of the occupancy sensor nodes is configured to (i) sense occupancy in a first space and (ii) transmit packets wirelessly, the packets being in a first set of packets, each of the packets in the first set comprising a first indication whose value is based on whether or not occupancy is sensed in the first space, and wherein each node in a second subset of the occupancy sensor nodes is configured to (i) sense occupancy in a second space and (ii) transmit packets wirelessly, the packets being in a second set of packets, each of the packets in the second set comprising a second indication whose value is based on whether or not occupancy is sensed in the second space;
  a first thermostat situated in the first space, the first thermostat being configured to provide a first control signal onto a first output line, based on temperature sensed by the first thermostat;
  a first controller unit comprising:
    (i) a first radio transceiver, capable of receiving the packets comprising the first indication and
    (ii) a first processor, wherein the first processor is configured to modify the first control signal on the first output line based on the value of the first indication;
  a first fan coil unit (FCU) dedicated to the first space and controlled by the first control signal as modified by the first controller unit;
  a first luminaire node comprising a lamp whose light output level is based, at least in part, on the value of the first indication from at least one of the occupancy sensor nodes in the first subset;
  a second thermostat situated in the second space, the second thermostat being configured to provide a second control signal onto a second output line, based on temperature sensed by the second thermostat;
  a second controller unit comprising:
    (i) a second radio transceiver, capable of receiving packets comprising the second indication, and
    (ii) a second processor, wherein the second processor is configured to modify the second control signal on the second output line based on the value of the second indication; and
  a second fan coil unit dedicated to the second space and controlled by the second control signal as modified by the second controller unit.

12. The system of claim 11, wherein the first luminaire node comprises:
  (i) a third radio transceiver, capable of receiving packets comprising the first indication, and
  (ii) a third processor, wherein the third processor is configured to provide a third control signal based on the value of the first indication;
  wherein the light output level of the lamp is based on the third control signal.

13. The system of claim 11, the first luminaire node further comprising a first occupancy sensor unit, wherein the luminaire node is configured to (i) sense occupancy in the first space via the first occupancy sensor unit and (ii) transmit packets wirelessly, the packets being in the first set; wherein the light output level of the lamp is further based on whether or not occupancy is sensed by the first occupancy sensor unit.

14. The system of claim 11, wherein the first processor is configured to modify the first control signal on the first output line, by interrupting the first output line based on the value of the first indication.

15. The system of claim 14, wherein the first processor is configured to interrupt the first output line based on no occupancy being sensed.

16. The system of claim 11, wherein the second processor is configured to modify the second control signal on the second output line, by interrupting the second output line based on the value of the second indication.

17. The system of claim 11, wherein the first space and the second space are non-overlapping.

18. The system of claim 11, wherein the first space and the second space overlap each other.

19. The system of claim 11, wherein the first luminaire node is one of a plurality of luminaire nodes interacting with and controlled by at least some of the occupancy sensor nodes in the data network.

* * * * *